(No Model.)

A. C. CAREY.
FUSE BOX OR CUT-OUT.

No. 550,096. Patented Nov. 19, 1895.

Witnesses
J. F. Coleman
E. A. Finckel

Inventor
Augustus C. Carey
by Wm. H. Finckel
Atty.

ANDREW B.GRAHAM. PHOTO-LITHO. WASHINGTON, D.C.

UNITED STATES PATENT OFFICE.

AUGUSTUS C. CAREY, OF LAKE PLEASANT, MASSACHUSETTS.

FUSE-BOX OR CUT-OUT.

SPECIFICATION forming part of Letters Patent No. 550,096, dated November 19, 1895.

Application filed April 13, 1895. Serial No. 545,650. (No model.)

*To all whom it may concern:*

Be it known that I, AUGUSTUS C. CAREY, a citizen of the United States, residing at Lake Pleasant, in the county of Franklin and State of Massachusetts, have invented a certain new and useful Improvement in Fuse-Boxes or Cut-Outs, of which the following is a full, clear, and exact description.

Ordinarily in fuse-boxes or cut-outs for electrical installations common binding-screws are used to secure the various wires, including the fusible wires, and there are various objections to such use, which have furnished an occasion and cause for the present invention. Among these objections I may mention the fact that only a very small part of the surface of the wire is in contact with the parts that bind the wire in place. In connection with the fuse-wire it is necessary to run out the screw partly and wind the wire around the screw-post under the head of the aforesaid screw, and in so doing, on an occasion of renewing a burned-out fuse-wire, there is liability of the operator receiving a shock, owing to the fact that his fingers must necessarily come close to the leading-in or leading-out wires.

In my invention, in order to obviate the first objection, I slot the posts with which connection is made, so that the wires may be pushed into the slots and supplied with contact-blocks and then bound in the posts by nuts to thereby increase the contact-surface, and a similar provision avoids the second objection mentioned.

Figure 1:
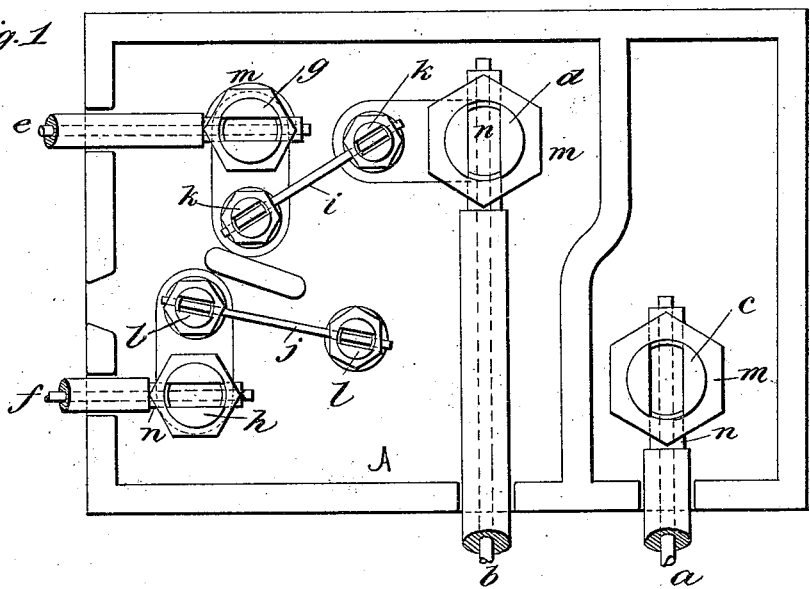
Figure 2:
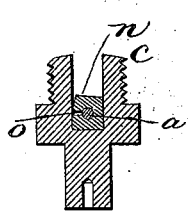
Figure 3:
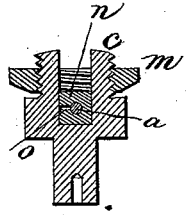
Figure 4:
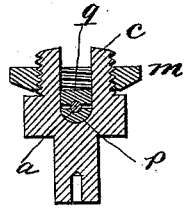
Figure 5:
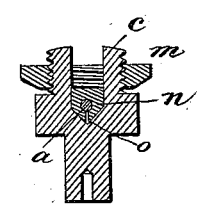
Figure 6:
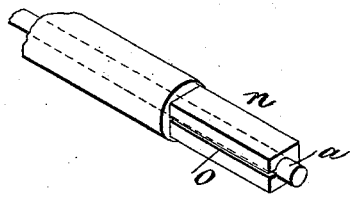

In the accompanying drawings, illustrating my invention, in the several figures of which like parts are similarly designated, Figure 1 is a plan view of a fuse-box or cut-out constructed in accordance with my invention. Fig. 2 is a vertical section of a post constructed in accordance with one form of my invention, and having the wire arranged within its slot ready to receive the nut. Fig. 3 is a similar view showing the nut applied. Fig. 4 is a similar view illustrating a further modification, and Fig. 5 is a similar view illustrating a still further modification. Fig. 6 is a perspective view of one end of a wire, illustrating a portion of my invention.

The box A may be of any usual material and construction, and adapted to receive the usual or any number of wires. In the instance shown, $a$ and $b$ are the line-wires, secured to the posts $c$ and $d$.

$e$ and $f$ are the distributing or leading-out wires, secured to the posts $g$ and $h$.

$i$ and $j$ are the fuse-wires, secured to the posts $k$ $k$ and $l$ $l$, respectively. Each of these several posts is provided with a vertical slot, as shown more in detail in Figs. 2, 3, 4, and 5. In these slots the bared ends of the wires are laid and secured by nuts $m$, which are applied to externally screw-threaded portions of the slotted ends of the posts. Obviously by this construction the wires are more readily inserted in the posts and connected therewith than is possible with the use of the ordinary binding-post, and equally obviously a larger superficial contact is made between the wires and the posts by my construction than is possible with such ordinary binding-posts, and, moreover, the union of the wires and posts is more secure; and it is also obvious that the wires may be threaded into the posts without the removal of the nuts, an insulated wrench being the only tool needed in order to run the nut partially off the post in order to thread the wire into the slot in the post beneath such nut, after which the nut may be turned down to bind the wire in place in the slot. The liability of shock to the operator is thereby reduced to a minimum.

Various auxiliary devices for effecting the union of the wire with such slotted post and for increasing the electrical contact of the wire with the post may be employed. For examples, I show in Figs. 1, 2, 3, and 6 the bared end of the wire supplied with a parallelepiped $n$ of metal, of a size adapted to fit within the slot in the post, and this parallelepiped is provided with a longitudinal bore for the reception of the bared end of the wire. In order to insure a tight fit of the wire in this bore, I prefer to slit one side of this block $n$, as at $o$, and to spread the parts slightly, so that when the nut is bound down upon the top surface of the block the edges of the slit will tend to come together and thereby the block will be compressed about the wire. Instead of a parallelepiped I may use a two-part block, as shown in Fig. 4, one portion $p$ having a curvilinear exterior to fit in the curvilinear bottom of the slot in the post, and the upper member $q$ being flat and the adjacent faces of these two members $p$ and $q$ being grooved to receive the wire between them and, if need be, one of the grooves may be larger than the other. Still another modification is shown in Fig. 5, wherein the bottom of the block is made V shape in cross-section, the slit being made in the line of the apex of the V and extending to the central bore, such a V-shaped block being fitted to a post having a slot whose bottom is correspondingly shaped, so that when the nut is applied the pressure thereof will force the block into the V-shaped bottom of the slot and thereby compress the slit portion about the wire. By the use of these blocks it will be obvious that the full superficial surface of the wire may be brought into electrical contact with the binding-post. Other and obvious modifications of this portion of my invention may be made, but I deem the foregoing sufficient to illustrate the principle of the invention.

I do not limit my invention in binding-posts to their use in fuse-boxes or cut-outs, and have described the same in connection with such an electrical device simply for the reason that it is of very great practical value in such use.

It will be clear from the foregoing that the wires may be inserted in the slotted posts from outside the box, and therefore without the necessity of the operator coming into contact with the metal of the box at all, openings being made in the outer walls of the box, as shown, for this purpose.

What I claim is—

1. A binding post for electrical wires having a longitudinally slotted end, a contact-increasing block fitted to such end and adapted to receive the wire, an external screw-thread on such slotted end, and a nut applied to said external screw-thread and adapted to be turned down upon the block to bind the wire within the slot in the post, substantially as and for the purpose described.

2. A binding post, for electric wires, having a longitudinal slot, and a wire provided with a block adapted to be fitted in such slot, and a nut applied to the post to bear upon and retain the block and its inclosed wire within the slot in the post, substantially as described.

3. A binding post having a longitudinal slot and a nut, combined with a block fitted to the slot in such post and held therein by the nut, the said block being divided and bored longitudinally and adapted to receive the bared end of a wire, substantially as described.

4. A binding post having a longitudinal slot and a nut, combined with a block fitted to the slot in such post and held therein by the nut, the said block being slitted and bored longitudinally, and adapted to receive the bared end of a wire, substantially as described.

In testimony whereof I have hereunto set my hand this 11th day of April, A. D. 1895.

AUGUSTUS C. CAREY.

Witnesses:
WALTER S. ROBINSON,
GEO. D. ROBINSON.